United States Patent [19]
Calvert

[11] Patent Number: 6,158,948
[45] Date of Patent: Dec. 12, 2000

[54] CONE COLLECTING AND LOADING SYSTEM

[76] Inventor: Lincoln A. Calvert, P.O. Box 42474, Portland, Oreg. 97242

[21] Appl. No.: 09/140,849

[22] Filed: Aug. 27, 1998

[51] Int. Cl.$^7$ ........................................... B60P 1/50
[52] U.S. Cl. ........................... 414/501; 414/547; 414/553; 414/555; 116/63 C
[58] Field of Search ..................... 414/486, 488, 414/489, 501, 502, 528, 547, 551, 553, 555; 404/6, 9, 10; 116/63 C

[56] References Cited

U.S. PATENT DOCUMENTS

| | | | |
|---|---|---|---|
| 3,268,052 | 8/1966 | Asbury | 414/523 X |
| 3,473,679 | 10/1969 | Weichel | 414/498 X |
| 3,750,900 | 8/1973 | Piercey | 414/503 X |
| 3,796,331 | 3/1974 | Dutton | 414/501 X |
| 4,345,869 | 8/1982 | King | 414/528 X |
| 4,363,583 | 12/1982 | Bontrager | 414/501 X |
| 5,170,947 | 12/1992 | Houle et al. | 414/489 X |
| 5,244,334 | 9/1993 | Akita et al. | 414/503 X |
| 5,529,429 | 6/1996 | Pelegrin | 404/9 |
| 5,599,157 | 2/1997 | Ellington | 414/486 X |

FOREIGN PATENT DOCUMENTS

| | | | |
|---|---|---|---|
| 1318514 | 1/1963 | France | 414/486 |
| 3930626 | 3/1991 | Germany | 414/528 |
| 4134451 | 7/1992 | Germany | 414/555 |

*Primary Examiner*—James W. Keenan

[57] ABSTRACT

A system for collecting traffic cones is provided including a tractor and a trailer connected to the tractor for trailing the same. Next provided is a pick-up assembly for picking up a cone and placing the same on the trailer for stacking. Also, a conveyor is mounted on the trailer for transporting the cones to a rear extent of the trailer.

12 Claims, 2 Drawing Sheets

CONE COLLECTING AND LOADING SYSTEM

BACKGROUND OF THE INVENTION

1. Field of the Invention

The present invention relates to cone collectors and more particularly pertains to a new cone collecting and loading system for picking up cones from a highway and placing the same on a trailer for stacking.

2. Description of the Prior Art

The use of cone collectors is known in the prior art. More specifically, cone collectors heretofore devised and utilized are known to consist basically of familiar, expected and obvious structural configurations, notwithstanding the myriad of designs encompassed by the crowded prior art which have been developed for the fulfillment of countless objective and requirements.

Known prior art cone collectors include U.S. Pat. No. 5,054,648; U.S. Pat. No. 5,244,334; U.S. Pat. No. 4,747,525; U.S. Pat. No. 5,213,464; and U.S. Pat. Des. Nos. 254,429.

In these respects, the cone collecting and loading system according to the present invention substantially departs from the conventional concepts and designs of the prior art, and in so doing provides an apparatus primarily developed for the purpose of picking up cones from a highway and placing the same on a trailer for stacking.

SUMMARY OF THE INVENTION

In view of the foregoing disadvantages inherent in the known types of cone collectors now present in the prior art, the present invention provides a new cone collecting and loading system construction wherein the same can be utilized for picking up cones from a highway and placing the same on a trailer for stacking.

The general purpose of the present invention, which will be described subsequently in greater detail, is to provide a new cone collecting and loading system apparatus and method which has many of the advantages of the cone collectors mentioned heretofore and many novel features that result in a new cone collecting and loading system which is not anticipated, rendered obvious, suggested, or even implied by any of the prior art cone collectors, either alone or in any combination thereof.

To attain this, the present invention generally comprises a plurality of cones each having a weighted lower extent with a generally cylindrical configuration. Each lower extent is equipped with a first diameter and a first height. As best shown in FIG. 3, each cone further has an upper extent with a generally cylindrical configuration. The upper extent of each cone has the first diameter and a second height about ½ the first height. Integrally coupled between the upper extent and the lower extent is an intermediate extent. For reasons that will soon become apparent, the intermediate extent has a third height less than the second height and a second diameter about ½ the first diameter. Next provided is a tractor with a cab compartment having a seat therein and a mechanized rotating coupler. Associated therewith is a trailer having a rectangular configuration with a top face, a bottom face, and a peripheral side wall formed therebetween. Such peripheral side wall is defined by a pair of side walls and a rear face thus affording an open front. The trailer further includes two rear wheels rotatably mounted to the bottom face thereof adjacent to the rear face. As shown in FIGS. 1 & 2, the trailer further includes a conveyor assembly having a plurality of rollers each with a width equal to less than ⅓ a width of the trailer. Each of the rollers is rotatably mounted to the top face of the trailer along an entire length of one of the side faces thereof. It should be noted that the rollers have a flexible belt mounted thereon. A leading one of the rollers has a first extension extending therefrom and rotatable therewith. A tight angle gear joint is coupled to an end of the extension. A second extension extends forwardly from the gear joint in perpendicular relationship with the first extension and rotatable therewith. Connected between the rotating coupler of the tractor and the second extension is a universal joint. In use, the universal joint is adapted for effecting the movement of the conveyor towards the rear face of the trailer. Finally, a pick-up assembly is provided including a rotating adapter mounted on the tractor above the cab, as shown in FIG. 1. Such rotating adapter serves for rotating about a vertical axis. A telescoping member has an inboard end pivotally coupled to the rotating adapter. As shown in the Figures, the telescoping member pivots about a horizontal axis. An outboard end of the telescoping member has a C-shaped clamp pivotally coupled thereto. In operation, the pick-up assembly is adapted to maneuver the C-shaped clamp between the cones and further clamp the intermediate extent thereof for picking up the cones and positioning the same on the conveyor of the trailer.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new cone collecting and loading system apparatus and method which has many of the advantages of the cone collectors mentioned heretofore and many novel features that result in a new cone collecting and loading system which is not anticipated, rendered obvious, suggested, or even implied by any of the prior art cone collectors, either alone or in any combination thereof.

It is another object of the present invention to provide a new cone collecting and loading system which may be easily and efficiently manufactured and marketed.

It is a further object of the present invention to provide a new cone collecting and loading system which is of a durable and reliable construction.

An even further object of the present invention is to provide a new cone collecting and loading system which is susceptible of a low cost of manufacture with regard to both materials and labor, and which accordingly is then susceptible of low prices of sale to the consuming public, thereby making such cone collecting and loading system economically available to the buying public.

Still yet another object of the present invention is to provide a new cone collecting and loading system which provides in the apparatuses and methods of the prior art some of the advantages thereof, while simultaneously overcoming some of the disadvantages normally associated therewith.

Still another object of the present invention is to provide a new cone collecting and loading system for picking up cones from a highway and placing the same on a trailer for stacking.

Even still another object of the present invention is to provide a new cone collecting and loading system that includes a tractor and a trailer connected to the tractor for trailing the same. Next provided is a pick-up assembly for picking up a cone and placing the same on the trailer for stacking. Also, a conveyor is mounted on the trailer for transporting the cones to a rear extent of the trailer.

These together with other objects of the invention, along with the various features of novelty which characterize the invention, are pointed out with particularity in the claims annexed to and forming a part of this disclosure. For a better understanding of the invention, its operating disadvantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed descriptions thereof. Such description makes reference to the annexed drawings wherein.

DETAILED DESCRIPTION OF THE PREFERRED EMBODIMENT

With reference now to the drawings, and in particular to FIGS. 1 through 5 thereof, a new cone collecting and loading system embodying the principles and concepts of the present invention will be described.

Figure 3:
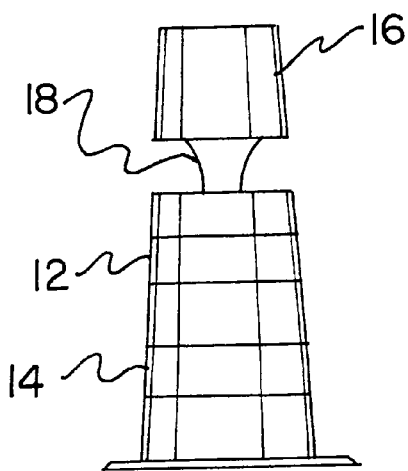
FIG. 3 is a side view of one of the cones of the present invention.

The present invention, generally designated by reference numeral 10, includes a plurality of cones 12 each having a weighted lower extent 14 with a generally cylindrical configuration. Each lower extent is equipped with a first diameter and a first height. As best shown in FIG. 3, each cone further has an upper extent 16 with a generally cylindrical configuration. The upper extent of each cone has the first diameter and a second height about ½ the first height. Integrally coupled between the upper extent and the lower extent is an intermediate extent 18. For reasons that will soon become apparent, the intermediate extent has a third height less than the second height and a second diameter about ½ the first diameter. As an option, the upper and lower extents of the cone may have a slight frusto-conical configuration.

Next provided is a tractor 20 with a cab compartment 22 having a seat therein and a mechanized rotating coupler 23. Associated therewith is a trailer 24 having a rectangular configuration with a top face, a bottom face, and a peripheral side wall formed therebetween. Such peripheral side wall is defined by a pair of side walls and a rear face thus affording an open front. The trailer further includes two rear wheels 26 rotatably mounted to the bottom face thereof adjacent to the rear face. In use, the trailer is releasably mounted to the tractor for pulling purposes.

Figure 1:
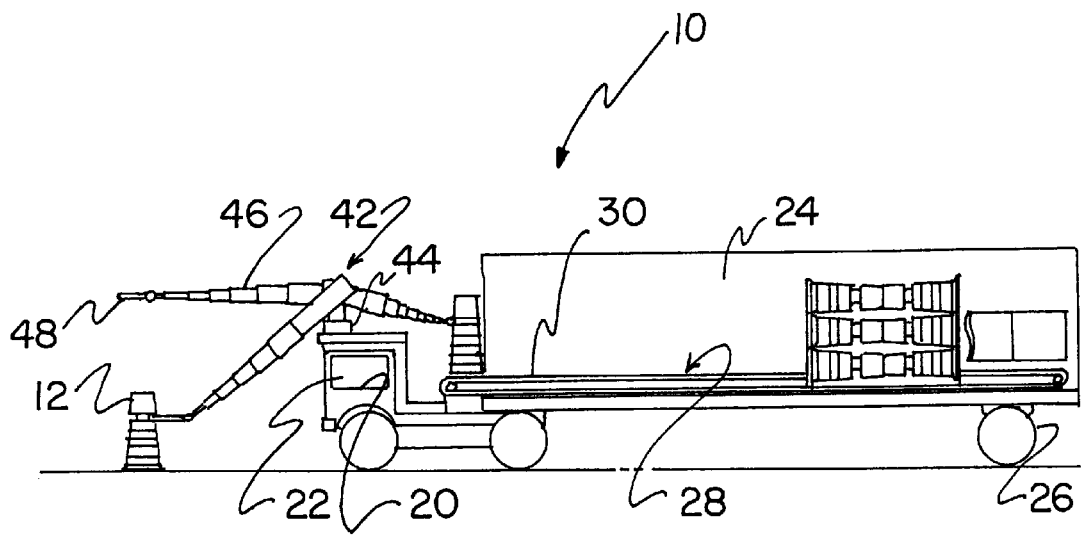
FIG. 1 is a side view of a new cone collecting and loading system according to the present invention.
Figure 2:
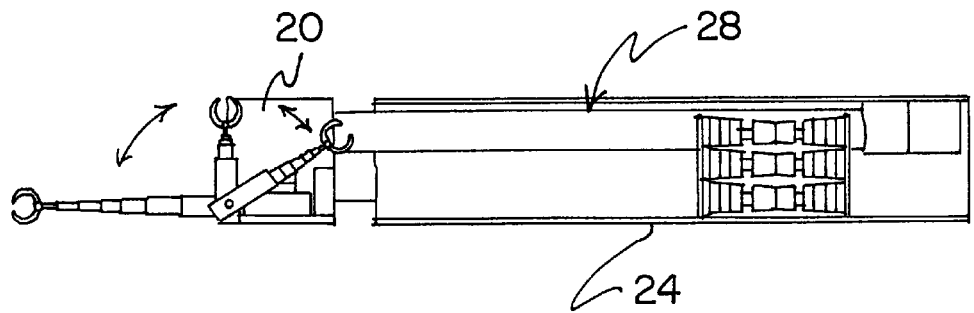
FIG. 2 is a top view of the present invention.
Figure 4:
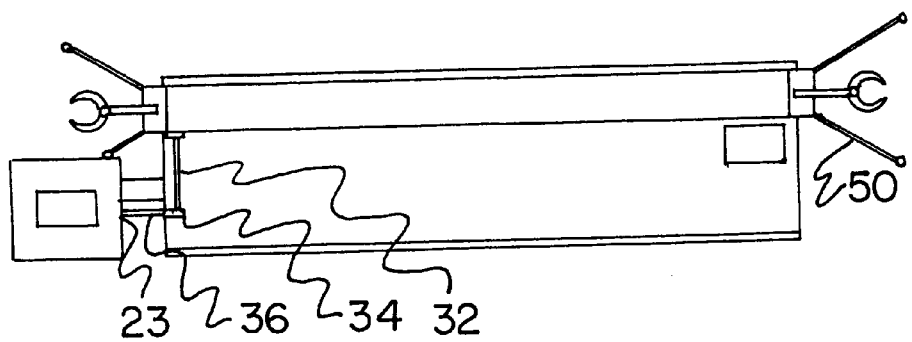
FIG. 4 is a top view of an alternate embodiment of the present invention.

As shown in FIGS. 1 & 2, the trailer further includes a conveyor assembly 28 having a plurality of rollers each with a width equal to less than ⅓ a width of the trailer. Each of the rollers is rotatably mounted to the top face of the trailer along an entire length of one of the side faces thereof. It should be noted that the rollers have a flexible belt 30 mounted thereon. A front end of the conveyor preferably extends from the open front of the trailer.

For driving the conveyor, a leading one of the rollers has a first extension 32 extending therefrom and rotatable therewith. A right angle gear joint 34 is coupled to an end of the extension. A second extension 36 extends forwardly from the gear joint in perpendicular relationship with the first extension and rotatable therewith. Connected between the rotating coupler of the tractor and the second extension is an unillustrated universal joint. In use, the universal joint is adapted for allowing the rotating coupler to effect the movement of the conveyor towards the rear face of the trailer. When the present invention incorporates a tractor which fails to have a rotating coupler, the trailer may be equipped with a dedicated motor and gear assembly for moving the conveyor.

Finally, a pick-up assembly 42 is provided including a rotating adapter 44 mounted on the trailer above the cab, as shown in FIG. 1. Such rotating adapter servers for rotating about a vertical axis. A telescoping member 46 has an inboard end pivotally coupled to the rotating adapter. As shown in the Figures, the telescoping member pivots about a horizontal axis. An outboard end of the telescoping member has a C-shaped clamp 48 pivotally coupled thereto. The C-shaped clamp preferably has a pair of C-shaped portions which are hingably coupled for clamping. It should be noted that each of the aforementioned pivotal couplings are controlled via a plurality of levers situated within the cab.

In operation, the pick-up assembly is adapted to maneuver the C-shaped clamp between the cones and further clamp the intermediate extents thereof for picking up the cones and positioning the same on the conveyor of the trailer. As such, a first user positioned in the tractor controls the pick-up assembly for picking up the traffic cones from a road and placing the same on the conveyor. The cones are then transported to a second user via the conveyor for stacking the traffic cones on the trailer in a uniform manner. As an option, shelves may be situated within the trailer for housing the cones.

Figure 5:
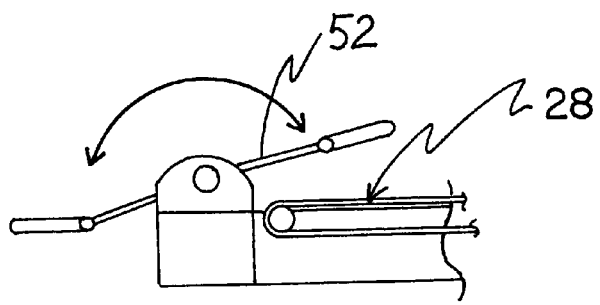
FIG. 5 is a detailed side view of the pick up assembly of the alternate embodiment of FIG. 4.

In an alternate embodiment, a pair of pivoting assemblies are mounted to a front and rear edge of the bottom face of the trailer. (see FIGS. 4 and 5) for picking up cones at the front of the trailer and dropping off or positioning cones from the rear of the trailer, although either pivoting assembly may be used for picking up and depositing cones. It should noted that, in the present embodiment, the rear face is open. As shown in FIG. 5, each pivoting assembly of the present embodiment is similar to the pivoting assembly of the previous embodiment except that a swing member 52 is employed which may not be telescopic. Further, each pivoting assembly of the present embodiment is controlled by a dedicated user. As an option, a pair of guide rails 50 flank the pivoting assemblies. Each pair of guide rails converge toward one of the pivoting assemblies for guiding cones toward the swing arm of the pivoting assembly as a cone moves relatively toward the pivoting assembly.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A system for collecting traffic cones comprising, in combination:

a plurality of cones each having a weighted lower extent with a generally cylindrical configuration with a first diameter and a first height, an upper extent with a generally cylindrical configuration with the first diameter and a second height about ½ the first height, and an intermediate extent with a generally cylindrical configuration integrally coupled between the upper extent and the lower extent in coaxial relationship therewith, the intermediate extent having a third height less than the second height and a second diameter about ½ the first diameter;

a tractor with a cab compartment having a seat therein and a mechanized rotating coupler;

a trailer having a rectangular configuration with a top face, a bottom face, and a peripheral side wall formed therebetween defined by a pair of side walls and a rear face thus affording an open front, the trailer further including two rear wheels rotatably mounted to the bottom face thereof adjacent to the rear face and a conveyor assembly including a plurality of rollers each with a width equal to less than ⅓ a width of the trailer and rotatably mounted to the top face of the trailer along an entire length of one of the side faces thereof, the rollers having a belt mounted thereon, a leading one of the rollers having a first extension extending therefrom and rotatable therewith, a right angle gear joint coupled to an end of the extension with a second extension extending forwardly therefrom in perpendicular relationship with the first extension and rotatable with the gear joint, the second extension being rotatable with the rotating coupler of the tractor for effecting the movement of the conveyor towards the rear face of the trailer;

a pick-up assembly including a rotating adapter mounted on the tractor above the cab for rotating about a vertical axis, a telescoping member having an inboard end pivotally coupled to the rotating adapter about a horizontal axis and an outboard end having a C-shaped clamp pivotally coupled thereto, wherein the pick-up assembly is adapted to maneuver the C-shaped clamp between the cones and further clamp the intermediate extent thereof for picking up the cones and positioning the same on the conveyor of the trailer.

2. A system for collecting traffic cones comprising:

a tractor;

a trailer connected to the tractor for trailing the same;

at least one cone member, the cone member having a lower extent for positioning on a ground surface, an upper extent, and an intermediate extent located between and connecting the upper and lower extents, the cone member having a longitudinal axis extending through the lower, upper and intermediate extents, the lower, upper, and intermediate extents each having a width measured perpendicular to the longitudinal axis, the intermediate extent having a smaller width than the lower and upper extents; and a pick-up assembly including an arm connected to at least one of the tractor and trailer, the pick-up assembly including a clamp connected to the arm and being adapted to engage the smaller width of the intermediate extent of the cone between the upper and lower extents.

3. A system for collecting traffic cones as set forth in claim 2 wherein the clamp comprises a pair of finger members forming a generally C-shaped configuration.

4. A system for collecting traffic cones as set forth in claim 2 wherein the pick up assembly comprises a pivot including a rotating adapter situated between the clamp and the tractor for permitting the clamp to pivot about a vertical axis, and a telescoping member pivotally coupled to the rotating adapter.

5. A system for collecting traffic cones as set forth in claim 2 wherein the trailer has a conveyor mounted thereon.

6. A system for collecting traffic cones as set forth in claim 5 wherein the conveyor runs between a front and rear edge of the trailer.

7. A system for collecting traffic cones as set forth in claim 5 wherein the conveyor has a width less than ⅓ that of the trailer.

8. A system for collecting traffic cones as set forth in claim 5 wherein the conveyor is powered by the tractor.

9. A system for collecting traffic cones as set forth in claim 2 comprising two pick-up assemblies, a first one of the pick-up assemblies being positioned at a front of the trailer for receiving cones from a ground surface and placing the cones in the trailer, and a second one of the pick-up assemblies being positioned at a rear of the trailer for taking cones from the trailer and placing the cones on a ground surface.

10. A system for collecting traffic cones comprising, in combination:

a plurality of cones each having a weighted lower extent with a generally cylindrical configuration, an upper extent with a generally cylindrical configuration, and an intermediate extent with a generally cylindrical configuration integrally coupled between the upper extent and the lower extent in coaxial relationship therewith, the intermediate extent having a diameter about one half of a diameter of the upper extent;

a tractor with a mechanized rotating coupler;

a trailer having a substantially rectangular configuration with an open front, the trailer including a conveyor assembly extending along a length of the trailer, the conveyor assembly including a plurality of rollers having a belt mounted thereon;

a pick-up assembly including a rotating mechanism mounted on the tractor for rotating about a vertical axis, a telescoping member having an inboard end pivotally coupled to the rotating mechanism, the inboard end being pivotable about a horizontal axis, a clamp pivotally coupled to an outboard end of the telescoping member, wherein the pick-up assembly is adapted to maneuver the clamp between the upper and lower extent of the cones and clamp the intermediate extent thereof for picking up the cones and positioning the cones on the conveyor of the trailer.

11. A system for collecting traffic cones as set forth in claim 10 wherein the conveyor has a width equal to less than ⅓ a width of the trailer and rotatably mounted to the top face of the trailer.

12. A system for collecting traffic cones as set forth in claim 10 additionally comprising at least one cone member, the cone member having a lower extent for positioning on a ground surface, an upper extent, and an intermediate extent located between and connecting the upper and lower extents, the cone member having a longitudinal axis extending through the lower, upper and intermediate extents, the lower, upper, and intermediate extents each having a width measured perpendicular to the longitudinal axis, the intermediate extent having a smaller width than the lower and upper extents.

* * * * *